(12) United States Patent
Osaki

(10) Patent No.: US 6,377,588 B1
(45) Date of Patent: Apr. 23, 2002

(54) METHOD AND APPARATUS FOR REDUCING JITTER OF A PROGRAM CLOCK REFERENCE IN A TRANSPORT STREAM OF MPEG OVER ATM, AND MPEG DECODER

(75) Inventor: Bunri Osaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/195,694

(22) Filed: Nov. 19, 1998

(30) Foreign Application Priority Data

Nov. 25, 1997 (JP) ............................................. 9-322856

(51) Int. Cl.[7] ................................................ H04J 3/06
(52) U.S. Cl. ........................ 370/508; 348/497; 370/516
(58) Field of Search ................................. 370/503, 505, 370/507–509, 516, 395, 535, 253; 375/371, 375, 376; 348/497

(56) References Cited

U.S. PATENT DOCUMENTS

| | | | |
|---|---|---|---|
| 5,260,978 A | | 11/1993 | Fleischer et al. |
| 5,287,182 A | * | 2/1994 | Haskell et al. ............... 375/376 |
| 5,467,137 A | | 11/1995 | Zdepski |
| 5,467,342 A | * | 11/1995 | Logston et al. ............. 370/509 |
| 5,612,981 A | * | 3/1997 | Huizer ........................ 375/376 |
| 5,640,388 A | | 6/1997 | Wodhead et al. |
| 5,652,627 A | * | 7/1997 | Allen .......................... 348/497 |
| 5,652,749 A | | 7/1997 | Davenport et al. |
| 5,668,841 A | | 9/1997 | Haskell et al. |
| 5,774,497 A | * | 6/1998 | Block et al. ................. 375/371 |
| 5,790,543 A | * | 8/1998 | Cloutier ...................... 370/395 |
| 5,881,114 A | * | 3/1999 | Moon .......................... 375/376 |
| 5,960,006 A | * | 9/1999 | Maturi et al. ............... 370/509 |
| 6,115,422 A | * | 9/2000 | Anderson et al. ........... 375/376 |
| 6,148,082 A | * | 11/2000 | Slattery et al. ............. 370/474 |

FOREIGN PATENT DOCUMENTS

| | | | |
|---|---|---|---|
| CA | 2243585 | 7/1998 | |
| EP | 0 577 329 A2 | 6/1993 | |
| EP | 0 801 510 A2 | 10/1997 | |
| EP | 0123456 | * 1/2000 | ................ 100/100 |
| JP | 7-66814 | 3/1995 | |
| JP | 08149428 A | 6/1996 | |
| JP | 8-168052 | 6/1996 | |
| JP | 8-321836 | 12/1996 | |
| JP | 9-9215 | 1/1997 | |
| JP | 9-64874 | 3/1997 | |
| JP | 9-116563 | 5/1997 | |
| WO | WO 95/19670 | 7/1995 | |

OTHER PUBLICATIONS

Australian Search Report dated Nov. 3, 1999.

* cited by examiner

*Primary Examiner*—Chau Nguyen
*Assistant Examiner*—Phuongchau Ba Nguyen
(74) *Attorney, Agent, or Firm*—McGinn & Gibb, PLLC

(57) ABSTRACT

Jitter of a Program Clock Reference (PCR) in a transport stream of an Moving Picture Experts Group (MPEG) signal transmitted over Asynchronous Transfer Mode (ATM) system is reduced by correcting PCR to PCR−(T−δ) if |PCR−STC|>T−δ−Δ is true and (PCR−STC)>0, correcting PCR to PCR+(T−δ) if |PCR−STC|>T−δ−Δ is true and (PCR−STC)<0, and making no correction if −PCR−STC−>T−δ−Δ is false. The program clock reference received is represented by PCR, a system time clock at the time when the program clock reference is received is represented by STC, a period of a transport stream packet at an output terminal of an MPEG encoder is represented by T, a packet transmission time of the transport stream packet at an input terminal of the apparatus is represented by δ, and a tolerable range is represented by Δ.

7 Claims, 4 Drawing Sheets

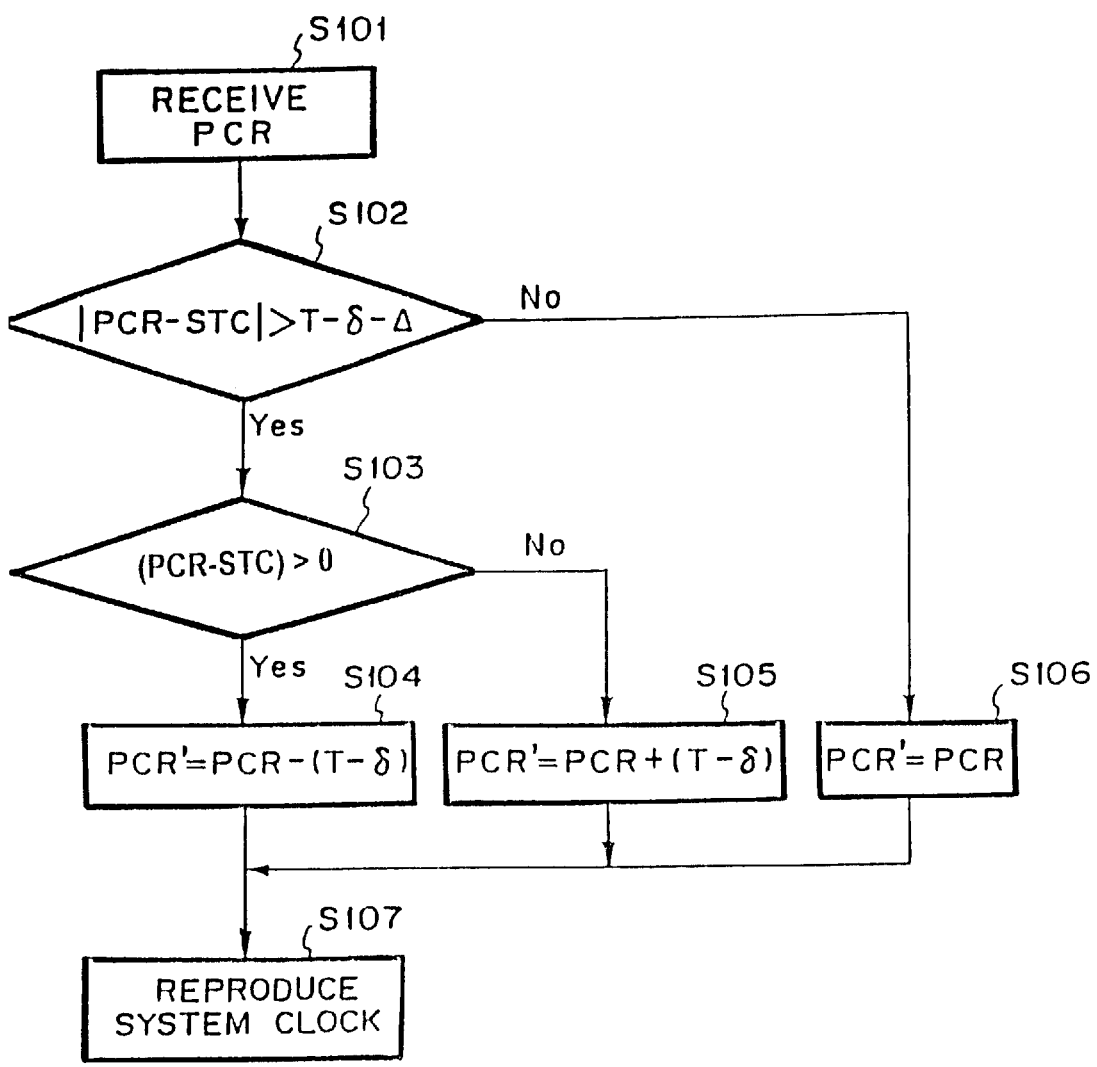

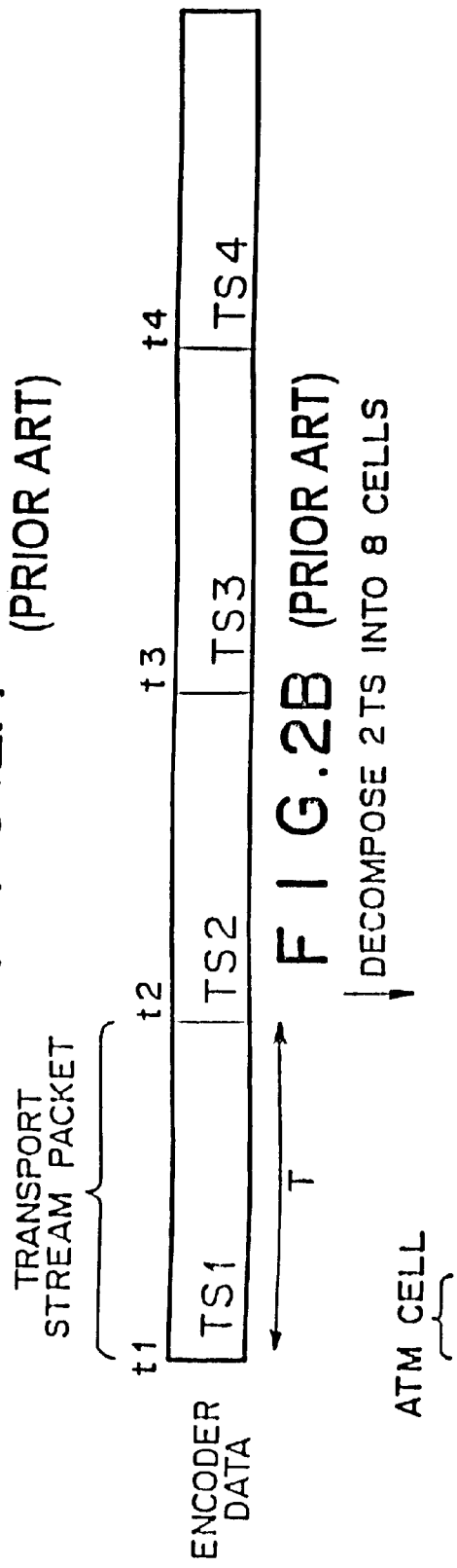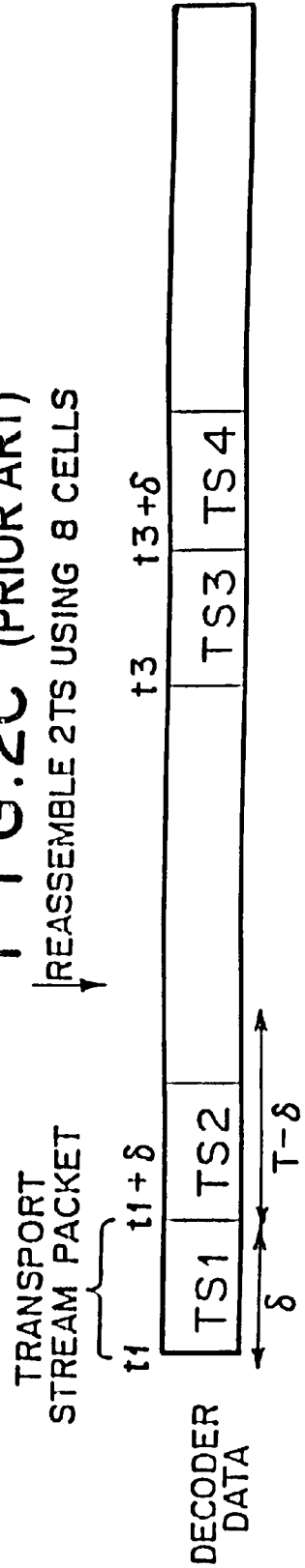

METHOD AND APPARATUS FOR REDUCING JITTER OF A PROGRAM CLOCK REFERENCE IN A TRANSPORT STREAM OF MPEG OVER ATM, AND MPEG DECODER

BACKGROUND OF THE INVENTION

1. Field of the Invention

The present invention relates to a method and apparatus for reducing a jitter of a program clock reference of an MPEG signal transmitted according to MPEG (Moving Picture Experts Group) over ATM (Asynchronous Transfer Mode) system. The present invention also relates to an MPEG decoder having the apparatus for reducing the jitter of a program clock reference of an MPEG signal transmitted according to MPEG over ATM system.

2. Description of the Related Art

In the MPEG 2 system standard which is an storage/transmission standard of moving pictures, STC (System Time Clock) is used in an encoder for encoding audio and video signals into code and a decoder for decoding code into audio and video signals. The decoder starts its decoding operation using code in a main buffer and outputs decoded data to a reorder buffer at the time when STC becomes the same as DTS (Decoding Time Stamp) which corresponds to the codes in the main buffer. Further, the decoder outputs the decoded data in the reorder buffer at the time when STC becomes the same as PTS (Presentation Time Stamp) which corresponds to the decoded data. SCR (System Clock Reference) and PCR (Program Clock Reference) are defined as a time stamp for synchronizing STC of the decoder with STC of the encoder. The transmission interval of PCR must be set to 100 msec or less according to MEPG2 standard.

Further, in MPEG2 system, a transport stream (TS) is known as one of transmission streams. The transport stream consist of packets having a fixed length of 188 bytes, and such construction is adapted on the assumption that transmission is performed over ATM system or through digital broadcast system. A payload or adaptation field is allocated to a portion other than a packet header of the transport stream packet. The adaptation field has a function for transmitting information such as PCR and the like and a stuffing function.

A system for transmitting a signal of MPEG2 over ATM is known as MPEG over ATM. When a transport stream is transmitted over ATM, the transport stream is sent to AAL (ATM Adaptation Layer) to be processed into an ATM cell. An AAL1 cell, an AAL2 cell, and an AAL5 cell are selected as the ATM cell. For the processing a transport stream into an ATM cell, there may be considered a case where one transport stream packet is processed into five AAL5 cells, a case where two transport stream packets are processed into eight AAL5 cells and a case where three transport stream packets are processed into twelve AAL5 cells. In connection with these cases, it is an mandatory specification for both the transmission side and the reception side to support the format for processing two transport stream packets into eight AAL5 cells.

An MPEG2 data transmission apparatus disclosed in JPA-9-116563 can perform stream processing so as to greatly reduce the transmission processing time for transmitting MPEG2 data to an ATM channel according to the transport packet system and so as to reproduce the data accurately with respect to the time.

Further, a data transmission method and a data transmission system disclosed in JPA-9-64874 enables high-quality data transmission by excluding the influence of jitter between two transmission apparatuses which are connected to each other through an ATM communication channel.

Still further, an ATM clock reproducing apparatus disclosed in JPA-7-66814 is used in a broad band ISDN (B-ISDN) network when video signals having clocks which are independent of the network are transmitted, and it reproduces clocks in which jitter due to accumulation of residuals caused when the difference between time stamps is rounded to an integer at the reception side is suppressed.

Still further, an apparatus and a method for segmentation and time-synchronization of transmission of multimedia data disclosed in JPA-8-321836 aim to improve the segmentation and the time-synchronization of the multimedia digital data stream.

In the MPEG over ATM for transmitting an MPEG transport stream over ATM, as shown in of FIGS. 2A and 2B, two transport stream packets are processed into eight ATM cells of AAL5. On the other hand, at the reception side, two transport packets are reassembled at the time when eight ATM cells are received, and thus these two transport packets are coupled into a burst data as shown in FIG. 2C. Therefore, in accordance with a condition as to whether a packet in which PCR is inserted is a first packet or a second packet of the burst data, the position of PCR is displaced from its original position, so that jitter occurs in STC generated on the basis of the PCR.

SUMMARY OF THE INVENTION

An object of the present invention is to provide an MPEG decoder and a jitter reducing method and apparatus which can generate a system time clock of which jitter is reduced even when the position of a program clock reference in a received MPEG over ATM signal is varied.

According to a first aspect of the present invention, there is provided an apparatus for reducing a jitter of a program clock reference in a transport stream of an Moving Picture Experts Group (MPEG) signal transmitted over Asynchronous Transfer Mode (ATM) system, which comprises: means of correcting PCR to PCR−(T−δ) if |PCR−STC|>T−δ−Δ is true and sign(PCR−STC)>0 is true, correcting PCR to PCR+(T−δ) if |PCR−STC|>T−δ−Δ is true and sign(PCR−STC)>0 is false, and making no correction if |PCR−STC|>T−δ−Δ is false, wherein the program clock reference received is represented by PCR, a system time clock at the time when the program clock reference is received is represented by STC, a period of a transport stream packet at an output terminal of an MPEG encoder is represented by T, a packet transmission time of the transport stream packet at an input terminal of the apparatus is represented by δ, and a tolerable range is represented by Δ.

According to a second aspect of the present invention, there is provided an apparatus for reducing a jitter of a program clock reference in a transport stream of an MPEG signal transmitted over ATM system, which comprises: detection means for detecting a displacement of a reception timing of a transport stream packet containing the program clock reference with respect to a normal reception timing by a predetermined amount; and means of correcting a value of the program clock reference by the predetermined amount when the displacement is detected.

According to a third aspect of the present invention, there is provided an MPEG decoder which comprises the apparatus of the first or second aspect of the present invention.

According to a fourth aspect of the present invention, there is provided a method for reducing a jitter of a program clock reference in a transport stream of an MPEG signal transmitted over ATM system, which comprises: steps for correcting PCR to PCR−(T−δ) if |PCR−STC|>T−δ−Δ is true and sign(PCR−STC)>0 is true, correcting PCR to PCR+(T−67) if |PCR−STC|>T−δ−Δ is true and sign(PCR−STC)>0 is false, and making no correction if |PCR−STC|>T−δ−Δ is false, wherein the program clock reference received is represented by PCR, a system time clock at the time when the program clock reference is received is represented by STC, a period of a transport stream packet at an output terminal of an MPEG encoder is represented by T, a packet transmission time of the transport stream packet at an input terminal of the apparatus is represented by δ, and a tolerable range is represented by Δ.

According to a fifth aspect of the present invention, there is provided a method for reducing a jitter of a program clock reference in a transport stream of an MPEG signal transmitted over ATM system, which comprises: a step for detecting a displacement of a reception timing of a transport stream packet containing the program clock reference with respect to a normal reception timing by a predetermined amount, and a step for correcting a value of the program clock reference by the predetermined amount when the displacement is detected.

A system time clock regenerator included in an MPEG decoder which receives a program clock reference outputted from the PCR jitter reducing apparatus of the present invention can reproduce a system time clock which is not affected by a timing error of the program clock reference and thus has no jitter because the timing error of the program clock reference is corrected by the value thereof in the PCR jitter reducing apparatus of the present invention.

BRIEF DESCRIPTION OF THE DRAWINGS

FIG. 1 is a flowchart showing a method for reducing a jitter of a program clock reference in a transport stream of an MPEG signal transmitted over ATM system according to embodiment of the present invention;

FIGS. 2A to 2C are diagrams showing variation of the format of a transport stream when the transport stream is transmitted through an ATM network in the present invention and the prior art;

DETAILED DESCRIPTION OF THE PREFERRED EMBODIMENTS

Preferred embodiments according to the present invention will be explained hereunder with reference to the accompanying drawings.

First Embodiment

Before explaining the method and apparatus for reducing a jitter of a program clock reference in a transport stream of an MPEG signal transmitted over ATM system, an MPEG decoder having the apparatus for reducing a jitter will be explained.

Figure 4:
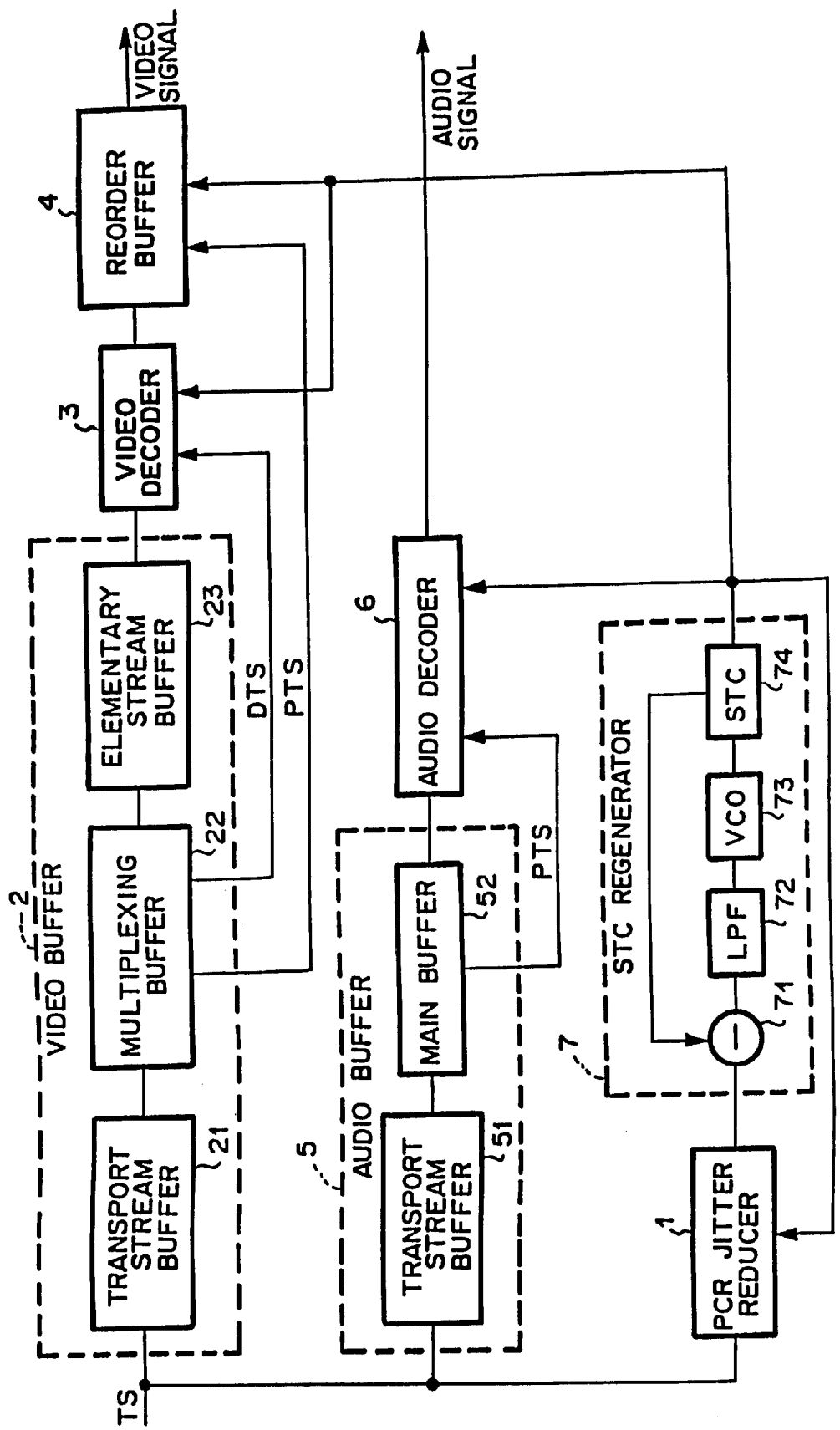
FIG. 4 is a block diagram showing a MPEG decoder having the apparatus for reducing a jitter of a program clock reference in a transport stream of an MPEG signal transmitted over ATM according to embodiment of the present invention.

Referring to FIG. 4, the MPEG decoder comprises PCR jitter reducer 1 which is the apparatus for reducing a jitter, video buffer 2, vide decoder 3, reorder buffer 4, audio buffer 5, audio decoder 6, and STC regenerator 7. Video buffer 2 comprises transport stream buffer 21, multiplexing buffer 22, and elementary stream buffer 23. Audio buffer 5 comprises transport stream buffer 51, and main buffer 52. STC regenerator 7 comprises subtracter 71, low-pass filter (LPF) 72, voltage controlled oscillator (VCO) 73, STC counter 74. Multiplexing buffer 22 and elementary stream buffer constitute a main buffer for video codes.

Transport stream buffers 21 and 51 treat a stream in a unit of the transport stream packet, and have a size of 512 bytes so as to store up to two transport stream packets. Transport stream buffers 21 and 51 output data_byte of the transport stream packets, i.e. packetized elementary stream (PES) in accordance with a leaky packet model. Multiplexing buffer 22 absorbs jitter generated during multiplexing, executes buffering having amount of a PES overhead, outputs an elementary stream, and output DTS and PTS. Elementary stream buffer 23 is used for assisting video decoder 3 and has a function as a video buffering verifier. Although main buffer 52 is similar to the main buffer for video codes, main buffer 52 has no function as the video buffering verifier.

Video decoder 3 decodes codes of a motion-compensated bidirectional inter-frame coding system to regenerate a video signal. Reorder buffer 4 reorders an order of frames from a decoding order to a temporal order. Audio decoder 6 decodes codes of sub-band coding system to regenerate audio signals.

Subtracter 71 subtracts STC inputted from STC counter 74 from PCR which is inputted from PCR jitter reducer 1 in which the jitter of PCR is reduced. The output of subtracter 71 is supplied to LPF 72 of which output is supplied to VCO 73. STC counter 74 counts up clocks which are supplied from VCO 73.

As explained above, video decoder 3 starts decoding operation when STC becomes the same as DTS, and reorder buffer 4 starts to output a video signal when STC becomes the same as PTS.

Second Embodiment

Next, the method for reducing a jitter of a program clock reference in a transport stream of an MPEG signal transmitted over ATM system will be explained.

A pair of transport stream packets arrives at PCR jitter reducer 1 as a burst data. The burst transmission time δ of one packet shown in FIG. 2C is a known value which is uniquely determined by a hardware.

FIG. 1 shows a method for reducing a jitter of a program clock reference in a transport stream of an MPEG signal transmitted over ATM system according to embodiment of the present invention.

First, in step S101, PCR in the burst data is received.

Subsequently, in step S102, it is identified whether the PCR thus received belongs to the first transport stream packet or the second transport stream packet in the burst data. This identification is made on the basis of a judgment of |PCR−STC|>T−δ−Δ.

In this judgment inequality, PCR represents the program clock reference received, STC represents a system time clock which the MPEG decoder has therein when receiving PCR, T represents the time length of the transport stream packet at the MPEG encoder side as shown in FIG. 2A, δ represents the time length of the burst-data type transport stream packet received by the reception/decoding apparatus side as shown in FIG. 2C, and Δ represents a tolerable range.

If the judgment result of step S102 is Yes, the processing goes to step S103. If the judgment result is NO, the processing goes to step S106.

In step S106, no correction is made on PCR, that is, the processing goes to step S107 with PCR' being set to PCR.

In step S103, if PCR−STC is positive, the processing goes to step S104, and in the other cases, the processing goes to step S105.

In step S104, PCR−(T−δ) is set to PCR', and then the processing goes to step S107. In step S105, PCR+(T−δ) is set to PCR', and then the processing goes to step S107. Instep S107, STC is reproduced by using PCR'.

In accordance with the initial condition, there may be provided a case where STC is based on PCR in the first transport stream packet in the burst data, and a case where it is based on PCR in the second transport stream packet in the burst data.

In the former case, when PCR in the first transport stream packet in the burst data is received, the processing flow progresses in the following order: S101→S102→S106→S107. In the former case, when PCR in the second transport stream packet in the burst data is received, the processing flow progresses in the following order: S101→S102→S103→S104→S107.

In the latter case, when PCR in the second transport stream packet in the burst data is received, the processing flow progresses in the following order: S101→S102→S106→S107. In the latter case, when PCR in the first transport stream packet in the burst data is received, the processing flow progresses in the following order: S101→S102→S103→S105→S107.

Third Embodiment

Figure 3:
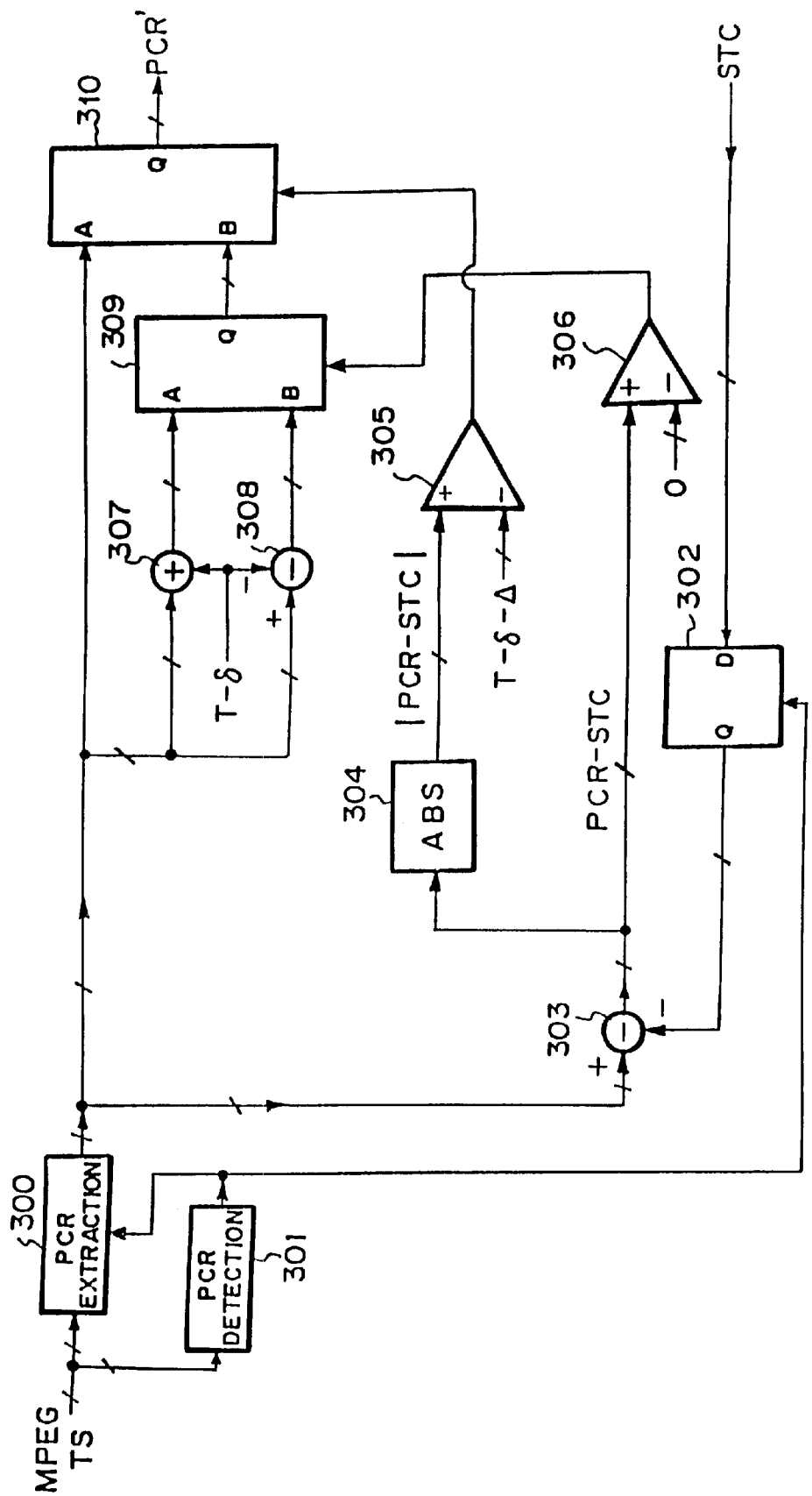
FIG. 3 is a block diagram showing the construction of an apparatus for reducing a jitter of a program clock reference in a transport stream of an MPEG signal transmitted over ATM system according to embodiment of the present invention.

FIG. 3 is a block diagram showing the construction of an apparatus for reducing a jitter of a program clock reference in a transport stream of an MPEG signal transmitted over ATM system according to the second embodiment. The apparatus for reducing a jitter is PCR jitter reducer 1 shown in FIG. 4. In FIG. 3, reference numeral 301 represents a PCR detection circuit for detecting PCR reception and making a detection pulse active at the detection time, reference numeral 300 represents a PCR extraction circuit for taking the value of PCR with the detection pulse as a trigger, reference numeral 302 represents a sample/hold circuit for receiving STC and sampling STC when the detection pulse is active, reference numeral 303 represents a subtracter for subtracting sampled STC from PCR, reference numeral 304 represents an absolute value circuit for calculating the absolute value of the output of the subtracter 303, reference numeral 305 represents a comparator for comparing the output of absolute value circuit 304 and the value of T−δ−Δ, reference numeral 306 represents a comparator for comparing the output of subtracter 303 with the value of zero, reference numeral 307 represents an adder for adding the value of T−δ to PCR, reference numeral 308 represents a subtracter for subtracting the value of T−δ from PCR, reference numeral 309 represents a selector for selecting the output of adder 307 or the output of subtracter 308 in accordance with the output of comparator 306, and reference numeral 310 represents a selector for selecting PCR or the output of selector 309 in accordance with the output of comparator 305.

The judgment of S102 is performed by sample/hold circuit 302, subtracter 303, absolute value circuit 304 and comparator 305. The judgment of step S103 is performed by sample/hold circuit 302, subtracter 303 and comparator 306. PCR, PCR−(T−δ) or PCR+(T−δ) is selected as PCR' by selector 309 and selector 310 in accordance with the two judgment results.

Here, the judgment of |PCR−STC|>T−δ−Δ shown previously will be considered as follows:

Assuming that the hardware concerned supports the transmission speed up to 60 Mbps, δ is equal to 25 μsec. If the calculation is made on the condition that the interval of PCR is equal to 100 msec and the system time clock is equal to 27 MHz, then δ=25 μsec every 100 msec is converted to 250 μsec in a one-second system. Here, the period of 27 MHz is equal to 37 nsec. Therefore, δ corresponds to the deviation of 37 nsec/250 μsec=about 150 ppm. When PCR has no jitter, the oscillation frequency of a voltage control oscillator 73 used in STC regenerator 7 is varied by about 1ppm at maximum even under the maximum control voltage, and the minimum control voltage. Accordingly, when there is the difference of several ppm or more between PCR and STC, the difference is definitely judged to be caused by the jitter of PCR. Accordingly, it is sufficient for performing judgment as to whether |PCR−STC|>T−δ−Δ is true that the value of the right side T−δ−Δ in |PCR−STC|>T−δ−Δ is equal to the value corresponding to the several ppm.

As explained above, according to the present invention, when MPEG transport streams are transmitted while packed into AAL5 of ATM system, the system time clock STC in which jitter is suppressed can be excellently reproduced at the MPEG decoder.

What is claimed is:

1. An apparatus for reducing a jitter of a program clock reference in a transport stream of a Moving Picture Experts Group (MPEG) signal transmitted over an Asynchronous Transfer Mode (ATM) system, which comprises:
   a first corrector for correcting PCR to PCR−(T−δ) if |PCR−STC|>T−δ−Δ is true and (PCR−STC)>0;
   a second corrector for correcting PCR to PCR+(T−δ) if |PCR−STC|>T−δ−Δ is true and (PCR−STC)<0; and
   a non-corrector for making no correction if |PCR−STC|>T−δ−Δ is false,
   wherein the program clock reference received is represented by PCR, a system time clock at the time when the program clock reference is received is represented by STC, a period of a transport stream packet at an output terminal of an MPEG encoder is represented by T, a packet transmission time of the transport stream packet at an input terminal of the apparatus is represented by δ, and a tolerable range is represented by Δ.

2. The apparatus as set forth in claim 1, wherein (T−δ−Δ) is set at a value above a difference between the program clock reference and the system time which is defined in a supposed case where the system time clock is oscillated at a limit value of an oscillation frequency range of a voltage control oscillator generating the system time clock and no jitter occurs in the reception timing of the program clock reference.

3. An MPEG decoder which comprises the apparatus as set forth in claim 1.

4. An apparatus for reducing a jitter of a program clock reference in a transport stream of a Moving Picture Experts Group (MPEG) signal transmitted over an Asynchronous Transfer Mode (ATM) system, which comprises:
   a detector for calculating a displacement of a reception timing of a transport stream packet containing the program clock reference with respect to a normal reception timing and determining whether said displacement exceeds a first preset amount defined as based on a packet transmission time of said transport stream; and an adjustor that adds or subtracts a second preset value to a value of the program clock reference when the displacement exceeds said first preset amount, wherein said detector performs the detection by judging whether a difference between a system time clock of said apparatus and the program clock reference is above the difference between the system time clock and the program clock reference which is defined in a supposed case where the system time clock is oscillated at a limit value of an oscillation frequency range of a voltage control oscillator generating the system time clock and no jitter occurs in the reception timing of the program clock reference.

5. A method for reducing a jitter of a program clock reference in a transport stream of an MPEG signal transmitted over ATM system, said method comprising:

correcting PCR to PCR−(T−δ) if |PCR−STC|>T−δ−Δ is true and (PCR−STC)>0;

correcting PCR to PCR+(T−δ) if |PCR−STC|>T−δ−Δ is true and (PCR−STC)<0; and making no correction if |PCR−STC|>T−δ−Δ is false, wherein the program clock reference received is represented by PCR, a system time clock at the time when the program clock reference is received is represented by STC, a period of a transport stream packet at an output terminal of an MPEG encoder is represented by T, a packet transmission time of the transport stream packet at an input terminal of the apparatus is represented by δ, and a tolerable range is represented by Δ.

6. The method as set forth in claim 5, wherein (T−δ−Δ) is set at a value above a difference between the program clock reference and the system time clock which is defined in a supposed case where the system time clock is oscillated at the limit value of an oscillation frequency range of a voltage control oscillator generating the system time clock and no jitter occurs in the reception timing of the program clock reference.

7. A method for reducing a jitter of a program clock reference in a transport stream of an MPEG signal transmitted over ATM system, comprising:

detecting a displacement of a reception timing of a transport stream packet containing the program clock reference with respect to a normal reception timing and determining whether said displacement exceeds a first preset amount defined as based on a packet transmission time of said transport stream, and incrementing or decrementing a value of the program clock reference by a second preset amount when the displacement exceeds said first preset amount, wherein said detecting is performed by judging whether a difference between a system time clock of an MPEG decoder and the program clock reference is above the difference between the system time clock and the program clock reference which is defined in a supposed case where the system time clock is oscillated at a limit value of an oscillation frequency range of a voltage control oscillator generating the system time clock and no jitter occurs in the reception timing of the program clock reference.

\* \* \* \* \*